(12) United States Patent
Tönsing et al.

(10) Patent No.: US 10,044,619 B1
(45) Date of Patent: *Aug. 7, 2018

(54) SYSTEM AND METHOD FOR PROCESSING AND FORWARDING TRANSMITTED INFORMATION

(71) Applicant: Netronome Systems, Inc., Santa Clara, CA (US)

(72) Inventors: Johann Heinrich Tönsing, Zwartkop (ZA); Roelof Nico DuToit, Highveld (ZA); Gysbert Floris van Beek Van Leeuwen, Erasmuckloof (ZA); Jan Neil Viljoen, Cambridge (GB); David Wells, Cambridge (GB); Leon Johannes Brits, Erasmuckloof (ZA); Jan Christoffel DuToit, Highveld (ZA)

(73) Assignee: Netronome Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,513

(22) Filed: Dec. 31, 2014

Related U.S. Application Data

(63) Continuation of application No. 13/337,184, filed on Dec. 26, 2011, now Pat. No. 8,929,374, and a continuation of application No. 12/064,585, filed as application No. PCT/IB2006/052933 on Aug. 23, 2006, now abandoned.

(30) Foreign Application Priority Data

Aug. 23, 2005 (GB) .................................. 0517304.2

(51) Int. Cl.
| | |
|---|---|
| H04L 12/28 | (2006.01) |
| H04L 12/56 | (2006.01) |
| H04L 12/801 | (2013.01) |
| H04L 12/891 | (2013.01) |
| H04L 12/851 | (2013.01) |
| H04L 12/813 | (2013.01) |

(52) U.S. Cl.
CPC .............. *H04L 47/12* (2013.01); *H04L 47/41* (2013.01); *H04L 47/20* (2013.01); *H04L 47/2483* (2013.01)

(58) Field of Classification Search
CPC ..... H04L 47/12; H04L 47/20; H04L 47/2483; H04L 47/41
See application file for complete search history.

(56) References Cited

U.S. PATENT DOCUMENTS 6,154,776 A    11/2000  Martin .......................... 709/226
6,501,741 B1 * 12/2002  Mikkonen ............. H04L 45/302
                                                               370/310

(Continued)

*Primary Examiner* — Lonnie Sweet
(74) *Attorney, Agent, or Firm* — Imperium Patent Works; T. Lester Wallace; Amir V. Adibi

(57) ABSTRACT

A system and method for handling a digital electronic flow between a first and second entity in which a flow policy is determined that is to be applied to the flow and the flow is then directed along a path in accordance with the policy. An ID is supplied for each flow and a tag associated with each flow which indicates the policy to be applied to its associated flow. Flows are also associated with one another, with associated flows having associated policies. In particular the flow may be processed or forwarded. The path may include a graph structure and virtual applications.

19 Claims, 5 Drawing Sheets

(56) References Cited

U.S. PATENT DOCUMENTS

| | | | |
|---|---|---|---|
| 6,636,480 B1 | 10/2003 | Walia et al. | 370/229 |
| 7,006,502 B2 * | 2/2006 | Lin | H04L 47/10 370/360 |
| 7,133,365 B2 * | 11/2006 | Klinker | H04L 29/06 370/238 |
| 7,471,629 B2 | 12/2008 | Melpignano | 370/232 |
| 7,639,613 B1 | 12/2009 | Ghannadian et al. | 370/232 |
| 7,650,634 B2 | 1/2010 | Zuk | 726/13 |
| 7,719,966 B2 * | 5/2010 | Luft | H04L 47/20 370/229 |
| 7,724,664 B2 | 5/2010 | Adams et al. | 370/235 |
| 8,929,374 B2 * | 1/2015 | Tonsing et al. | 370/392 |
| 2003/0086422 A1 | 5/2003 | Klinker et al. | 370/389 |
| 2004/0039820 A1 | 2/2004 | Colby et al. | 709/226 |
| 2005/0076228 A1 | 4/2005 | Davis et al. | 713/188 |
| 2006/0259656 A1 * | 11/2006 | Sullivan | H04L 41/145 710/22 |

\* cited by examiner

SYSTEM AND METHOD FOR PROCESSING AND FORWARDING TRANSMITTED INFORMATION

CROSS REFERENCE TO RELATED APPLICATION

This application is a continuation of, and claims priority under 35 U.S.C. § 120 from, nonprovisional U.S. patent application Ser. No. 13/337,184 entitled "System and Method for Processing and Forwarding Transmitted Information," filed on Dec. 26, 2011, published as U.S. Pat. Pub. No. 2012/0093160. Application Ser. No. 13/337,184 in turn is a continuation of, and claims priority under 35 U.S.C. § 120 from nonprovisional U.S. patent application Ser. No. 12/064,585 entitled "System and Method for Processing and Forwarding Transmitted Information," filed on Aug. 18, 2008, published as U.S. Pat. Pub. No. 2009/0204723. Application Ser. No. 12/064,585 in turn is a continuation of, and claims priority under 35 U.S.C. § 120 and §365(c) from International Application No. PCT/IB2006/052933, filed on Aug. 23, 2006, and published as WO 2007/023467 A3 on Mar. 1, 2007, which in turn claims priority from Great Britain Application No. 0517304.2, filed on Aug. 23, 2005, in the United Kingdom. The disclosure of each of the foregoing documents is incorporated herein by reference.

BACKGROUND

This invention relates to a system and method for handling transmitted information. More particularly it relates to a system and method of forwarding and processing a digital electronic flow between a first entity and a second entity.

SUMMARY

According to the invention there is provided a system for handling a digital electronic flow between a first entity and a second entity, which includes a flow policy determining means for determining the policy to be applied to the flow; and a directing means for directing the flow along a determined path in accordance with the relevant flow policy.

The system may include a flow ID supplying and identifying means for initially supplying an ID for each new flow from the first entity and for subsequently identifying the ID of an existing flow.

The flow policy determining means may provide a policy tag for each flow, the tag being associated with the ID of that flow, and the tag indicating the policy to be applied to that flow.

The flow policy determining means may determine the flow policy to be applied to a flow when the flow is first received and it may vary the policy applied to a flow during its lifetime.

The system may also include an association determining means for determining if a first flow is to be associated with a second flow and for applying associated flow policies to associated flows.

At least one processing means may be included in the path. Similarly, at least one forwarding means may be included in the path.

The processing means may include a graph structure, a processor, a memory, a virtual machine, and/or an application. The application may be an application running in kernel mode in a virtual machine or an application running in user mode in a virtual machine.

The forwarding means may include a graph structure, a network interface, a communication interface, a virtual switch, a virtual network interface and/or a virtual stream interface.

In particular, the directing means may direct the flow along a path that includes a flexible graph structure. The graph structure may have sub-graph or nested graph structures. The graph structure may also have processing and/or forwarding components The system may include a processor having an operating system with at least one real time processing function, and an application hosted within a kernel of the operating system or a user space of the operating system, and in which the directing means directs at least a part of the flow along a path that includes the application.

The entities forming the path may be connected in parallel, in series, or any combination thereof. The path may include internal and/or external components.

The flow policy determining means may be responsive to an application.

Further, the flow policy determining means may determine different flow policies for forward and return portions of a flow.

The flow policy determining means may determine the flow policy for a flow in accordance with any suitable criteria. In particular, these criteria may be memory usage, network bandwidth use, power dissipation, feedback from guest operating systems in virtual machines, feedback from applications, feedback from a processing means, and feedback from a forwarding means. They may also be fields in packet headers, data in packet payloads, and protocols and sets of protocols.

Similarly, the association determining means may associate flows in accordance with suitable criteria such as flows from a specific type of application, flows which use a specified protocol, flows which use a sub-protocol at a specified layer of the relevant protocol hierarchy, specified patterns in a specified part of traffic, flows associated with a specified set of communicating entities, flows from a contained path, and flows from specified links, networks and network interfaces.

Further according to the invention there is provided a method of handling a digital electronic flow between a first entity and a second entity, which includes determining a policy to be applied to a flow; and directing the flow along a determined path in accordance with the relevant flow policy.

Initially an ID may be supplied for each new flow from the first entity with the ID of an existing flow being subsequently identified.

The method may include providing a policy tag for each flow and associating the tag with the ID of that flow, the tag indicating the policy to be applied to that flow.

As indicated above at least one processing means and/or one forwarding means may be included in the path.

The flow policy to be applied to a flow may be determined when the flow is first received and may be varied during its lifetime.

The method may further include determining if a first flow is to be associated with a second flow and applying associated flow policies to associated flows.

The flow may be directed along a path that includes a flexible graph structure, that includes an application hosted within a kernel or a user space of an operating system having at least one real time processing function, that includes a plurality of entities connected in parallel and/or in series, or includes internal and/or external components.

The flow policy may be determined in response to an application and the flow policy may be different for forward and return portions of a flow.

The first and second entities may be network or communication devices, networking equipment (e.g. bridges/routers/switches), network nodes, computers, applications, tasks, processes, services, users, or other software or hardware systems.

The system may be connected to a network or other communication system in such a way that network traffic or other transmitted information is forced to traverse the system. Transmitted information may also originate at, terminate at, or traverse the system by virtue of the transmitted information having been appropriately constructed or formulated, e.g. by the information being addressed to the system using an appropriate address (e.g. a layer two networking address). Thus the system may be a router, a switch, a "bump in the wire" bridge, a "self learning" multi-port bridge, a relay, a proxy, or a gateway.

Furthermore, the system may comprise one or more processors or co-processors. If it has a plurality of processors/coprocessors, they may be interconnected using one or more of: physically shared memory; virtually shared memory implemented using a remote direct memory access (RDMA) mechanism; a bus like HyperTransport, PCI or PCI Express; any other network or other communications link like Gigabit Ethernet, Advanced Switching Interconnect, or Infiniband (whether datagram or stream oriented).

The system may be attached to communication networks or other telecommunication systems using network or communication interfaces. The attached network may be a telecommunication system or communication network for which the aggregate to which transmitted information belongs is explicitly identified as a part of the transmitted information, or where the aggregate can be inferred from parameters associated with the transmitted information or the transmission medium. The associating means may utilize equality or relatedness of this aggregate identifying information to associate transmitted information with other transmitted information. This aggregate identifying information may identify the flow, channel, circuit, pipe, session, stream, timeslot, frequency, spread spectrum code, label switched path, or wavelength of transmitted information.

The communication network may segment transmitted data into discrete datagrams. The datagrams may be IP packets, ATM cells, Ethernet frames, or may use any other protocol carried over any medium. The associating means may utilize information contained within the datagrams (both header information and payload information) as well as information retained over time by inspecting network/communication traffic to associate transmitted information with other transmitted information.

The format or interpretation of the transmitted information may be defined by a hierarchy of protocol layers. The associating means may inspect protocols at one or more of these layers to determine to which (if any) transmitted information other transmitted information is related.

The transmitted information may for example be network traffic which uses the Internet Protocol (IP) and/or Ethernet Protocol (IEEE 802.x). The associating means may examine IP and/or Ethernet headers as well as the payload of network packets, as well as headers or payloads of any protocols nested within these protocols, to determine to which (if any) transmitted information other transmitted information is related.

The transmitted information may contain identifying information which identifies the source (i.e. originator or initiator) and destination (i.e. addressee or target) of the transmitted information. This identifying information may contain network node identifiers in Internet Protocol address, MAC layer address, numerical, text, binary, or other formats. This identifying information may also contain identifiers that specify the user, application, component, process, task, subsystem or other entity within the network node which is the source or destination of the transmitted information. The identifying information may denote groups or other aggregates of the aforementioned sources or destinations. The identifying information may also specify the protocols or subprotocols used by the transmitted information—these may define the format, range, and/or namespace of the other identifying information. The associating means may utilize any of the aforementioned identifying information, and a combination of the aforementioned identifying information, to associate transmitted information with other transmitted information.

The transmitted information may itself directly or indirectly refer to associated transmitted information. The associating means may detect, extract, decode, interpret, and utilize these references to associate transmitted information with the referred to other transmitted information.

The transmitted information may for example be a signaling or control protocol, for example SIP/H.323/FTP/RSVP/CR-LDP etc, which may refer to associated data transmission information sessions/streams/paths/traffic.

The association means may also associate transmitted information according to a defined bundling policy. The bundling policy may group: transmitted information sent by a specific type of application or which uses a specified protocol or sub-protocol at a specified layer of the relevant protocol hierarchy; transmitted information which contains specified arbitrary patterns—where each pattern is sought in specified parts of the traffic, e.g. datagram headers, datagram payloads, within higher level (connection/session/application layer) data streams, etc; transmitted information associated with a specific set of communicating entities (e.g. user, server, device, network, application instance, service, or combinations thereof); transmitted information contained within a containing flow—e.g. within a tunnel, virtual circuit, virtual path, label switched path, virtual private network, trunk, etc; information transmitted over specified links or networks, or which entered the apparatus at specified network interfaces; any combination of the above, nested to a arbitrary depth.

The flow policy determining means classifies transmitted information in order to group transmitted information into categories. It may classify transmitted information according to a variety of criteria:

Classification is performed based on fields in packet headers, packet payloads (content), and state maintained for the flow being classified as well as state for the apparatus overall.

The classification means can decode protocols that span packet boundaries, or protocols that are layered on other protocols, using its built in knowledge of protocols, or additional installed protocol support modules. Whether or not a specific protocol or set of protocols was detected can be used as a classification criterion.

The classification means can extract data from the supported protocol layers and match that data against arbitrary patterns (including regular expressions, ranges, longest prefix matching of addresses, substring, and string/numerical equality and greater than/less than matching).

The classification means supports using Boolean and arithmetic expressions to combine classification sub-results into an overall result.

The system may also decide how a transmission is to be processed. This may be done using the result of the association means and the result of the flow policy determining means to determine the processing policy to be applied to the transmitted information. This policy specifies the set of components (in series, in parallel, or interconnected in an arbitrary graph) which need to further process/examine the traffic, together with additional processing parameters for each of these components (e.g. quality of service parameters to be applied by a traffic scheduler, or details of the tunnel into which a virtual private network module should en-tunnel traffic, etc.).

The processing means may generate, originate, terminate, store, examine, modify, duplicate, filter, encapsulate, un-encapsulate, and/or otherwise process transmitted information. The processing that is performed for a particular item or bundle or category of transmitted information is determined by the configured processing policy or, should no configured policy apply, by a default built-in policy.

The processing means may be modularized, i.e. it may be implemented as a set of interconnected modules or components. The components in the modularized processing means may be: Network and communication interfaces, which link the apparatus to external communication networks or transmission media; Association identification components and classification components, which detect the association between transmitted information and other transmitted information, and which determine the policy to be applied to transmitted information; Action graphs, which contain one or more traffic processing modules interconnected in an arbitrary graph, where the traffic processing modules are either instances of any of these components or are elementary processing modules; Virtual switches, which link any number (typically more than two) of these components, while performing the processing a real switch would perform, e.g. self learning of Ethernet addresses and multicasting/broadcasting of information; Virtual wires, which link two of these components; Virtual machines, which emulate uniprocessor or multiprocessor computer systems, and which run (possibly modified) standard operating systems (e.g. Linux, Microsoft Windows, Unix-like operating systems, real time operating systems, etc.); Virtual Network Interface Cards, which appear to be network interface cards to the operating systems/applications running in the Virtual Machines (e.g. to the networking stacks in the Virtual Machines) but which connect to these components instead of connecting to real hardware; Virtual stream interfaces, which enable applications to receive data as streams rather than packets—e.g. as virtual character devices/virtual file systems/devices which emulate stream oriented protocols like Sockets Direct Protocol etc.; Virtual shared memory mechanisms, which emulate shared memory based communication like remote direct memory access systems; Standard (unmodified) applications running in kernel mode or user mode in the Virtual Machines; Applications running in kernel mode or user mode in the Virtual Machines that have been developed to interact with an application programming interface (API) provided by the system.

These components are interconnected to form the highest level (most abstract level) dataflow graph within the system. Nesting of dataflow graphs (lower level graphs) is supported via the action graph mechanism.

Components may be arbitrarily mapped to (i.e. deployed or hosted on) a set of processors or coprocessors (specialized fixed function hardware) that have been interconnected in a cluster. Example: the network interfaces and some bundling (i.e. information association)/classification/action graph modules might be hosted on one processor (possibly a specialized processor like a network processor) whereas the other components might be hosted on other processors (possibly general purpose computing processors). The processors that host the components may be interconnected using shared memory (uniform or non-uniform), a bus/backplane, or any form of communication link which supports a message/packet/datagram/information stream passing paradigm.

The hosting means enables components to coexist on the processors that comprise the system. It also provides communication mechanisms which enable the components to interact with each other and with the rest of the system.

The hosting means incorporates an operating system which allocates resources (memory, dedicated CPUs or CPU time slices, coprocessors, disk space, network bandwidth etc.) to the components. This underlying operating system may be a real-time or non-real-time operating system, optionally with the ability to support virtual machines running on the underlying operating system.

The hosting means is able to link the components it hosts using a variety of internal and external communication mechanisms and media, including a shared memory communication mechanism, a message passing communication mechanism, and hybrid mechanisms.

The shared memory communication mechanism operates by the sender placing information which is to be communicated into a shared memory area which is accessible to the receiver. This area may be in a set of physical memory devices which are always physically accessible to both of the communicating parties, e.g. this may apply where the parties are applications running on the same processor or on different processors in a Symmetric Multiprocessing (SMP) system. In this case, virtual memory (if applicable) may need to be configured to explicitly permit sharing of memory segments/pages. Alternatively, the area may be implemented using dedicated shared memory hardware, possibly dual-port or multi-port. In either case, as an optional optimization, a sending processor may instruct the cache of a receiving processor to "pre-load" its cache with the communicated information or a subset thereof (e.g. headers of a datagram but not the payload of the datagram). This may not be required in cases where the processors share a cache or where the communicating parties run on a single processor. The system may support multiple disjoint shared memory pools. The intention is that applications in the same security class are configured to use a single memory pool, e.g. the applications that operate on traffic belonging to a specific set of protocols may be segregated from applications which process other protocols, or applications that act on traffic associated with a specific user/customer may be segregated from applications which act on behalf of another user/customer. Segregating shared memory pools will require one of the other communication mechanisms to be used to transfer information between pools, i.e. data will need to be copied between pools. The onus is on the administrator of the apparatus to define memory sharing policies which reach the appropriate compromise between the desired security policy and the desired performance levels.

As an alternative to fully shared memory, a virtual memory system may be used to remap pages to transfer ownership or accessibility between parties. In this case, additional memory may be consumed versus the shared memory option as pages may be larger than the data items which are to be communicated, and remapping pages will incur processing overhead, however security will be improved as the party/parties which are able to access (read or write) a specific data item can be specifically managed.

Remote direct memory access mechanisms can be used to implement virtually shared memory without requiring a physical shared memory. In this case, a mechanism for a receiving party to inform the sending party into which memory locations messages may be transferred (in essence to synchronies free list information) may be used.

The hosting means may also support linking components using a message passing system. The message passing system is able to utilize a variety of physical media, e.g. packet oriented network media, bus/backplane, stream/circuit channel oriented media, etc. It establishes one or more message passing queues across each link. If needed, messages are converted between transmission media by components who have access to multiple types of transmission media. The queues may be arranged in priority levels, where one or more queues are associated with each priority level. In this case, where a message needs to be transmitted/received before other messages, the system can place the message in a queue with priority higher than the priority of the queues into which the other messages are enqueued.

The system is able to operate across reliable transports or across unreliable transports (where the probability of transmissions being lost is non-zero). In cases where the underlying transport is unreliable, the system uses positive and/or negative acknowledgements as well as retries to ensure that messages that have to be delivered are delivered. Certain messages need not be delivered—these are discarded by the message passing system if needed (e.g. if resources do not suffice to transmit/deliver/receive/process the messages).

The hosting means can also use a combination of the following mechanisms:—The system may for example place one or more information structure in shared memory, then notify the recipient via a passed message/an interrupt/ an inter-task or inter-thread signal etc. that information is ready in shared memory to be read. The system may include optimizations to suppress these messages when the system knows that the recipient will "poll" the shared memory area, and to send messages to wake up the recipient where the recipient may be dormant (e.g. if messages have not been sent to the recipient for a while).

The directing means may forward information to a set of components, applications, subsystems, communication/networking interfaces, and/or external systems. The set of entities to which information must be forwarded and in which order they need to receive the information (i.e. which entity receives the information first, to which entity the information is then fed, etc.) are governed by the flow policy. This policy can be defined per bundle and per classification category, with the option to specify a set of policies that apply to all traffic not otherwise bundled/classified. A set of default flow policies may be built into the system.

The information may be forwarded to applications via APIs. This method is available to applications that have been designed to interact with these APIs, whether they are running in the underlying operating system (e.g. the real time OS/hypervisor) or are running in virtual machines. The information can also be forwarded to virtual machines via Virtual Network Interface Cards or Virtual Stream Interfaces. In this case, standard commercial off the shelf applications can receive the information provided they are able to be hosted within the virtual machines. External servers or other external nodes will receive the information as real network traffic/other communications transmissions.

The flow policy may also specify that only a subset of a bundle (i.e. typically a flow) should be directed to specific components. Components will often need to receive a segment of the flow from the start of the flow to somewhere in the middle of the flow—however some components may support receiving arbitrary sections of a flow ("joining" a flow in mid-stream).

The flow policy may depend on state variables within the system which are not specifically associated with the bundle/flow which is being processed (or in some cases which are not associated with any bundles/flows). Thus, the system may elect to direct a bundle/flow to one of an equivalent set of virtual machines which run on different processors within the system based on the current load of those processors—in effect load balance traffic amongst processors; the system may elect to modify the path taken through the system, e.g. omit certain components at certain times of day/days of the week, or omit operations that have been labeled optional (e.g. filtering unsolicited commercial email a.k.a. "spam") if system load exceeds a certain threshold (while continuing to perform operations that have been labeled critical e.g. traffic firewalling/virus filtering); the system may select the component which processes data from a set of equivalent components based on proximity to other components in the dataflow graph specified by the policy. Thus, if traffic enters the system at a network interface attached to processor, the software components hosted on or the hardware components directly attached to processor may be preferred to other equivalent components located elsewhere in the system, however if the cost to transfer information to processor in the system is outweighed by processor being more suited to hosting a specific component (because processor has greater processing capacity/more memory/specialized hardware at its disposal etc.) the system may elect to use processor to host a specific component even if an equivalent instance of the component may be available on processor. A mode where the system is configured to not automatically make substitutions, i.e. where the type and instance of each component is specifically configured, is also available. Whether automatically determined or manually configured, the system can therefore "cut-through" traffic or "off-load" traffic from some processors by using other processors/forwarding and processing hardware.

The flow policy may also depend on the state of external devices/components/systems, or of interfaces to these entities. Example: the system could load balance amongst various external servers based on their load, or select the appropriate destination for traffic based on the geographical location associated with the network address of the originator of the traffic, or determine the network link to use based on the used capacity of a set of network links.

The system behavior may change over time as follows.

The classification means may successively refine the category in which it places transmitted information as more transmitted information is received (e.g. traffic may be categorized as TCP traffic, then HTTP over TCP traffic, then web conferencing in HTTP over TCP traffic).

The association means may modify the association information, i.e. the bundle with which transmitted information is associated.

The fact that the classification category and bundling information changed might cause different flow policies to be implemented as other flow policies may be linked to the newly determined categories/bundles.

External systems or internal components may change association (i.e. bundling), classification and flow policies, and may also change how components are interconnected into dataflow graphs as well as how components are configured.

Other embodiments and advantages are described in the detailed description below. This summary does not purport to define the invention. The invention is defined by the claims.

BRIEF DESCRIPTION OF THE DRAWINGS

The invention is now described, by way of examples, with reference to the accompanying diagrammatic drawings which show schematically a system in accordance with the invention connected to clients, servers, and applications.

DETAILED DESCRIPTION

Reference will now be made in detail to some embodiments of the invention, examples of which are illustrated in the accompanying drawings.

Figure 1:
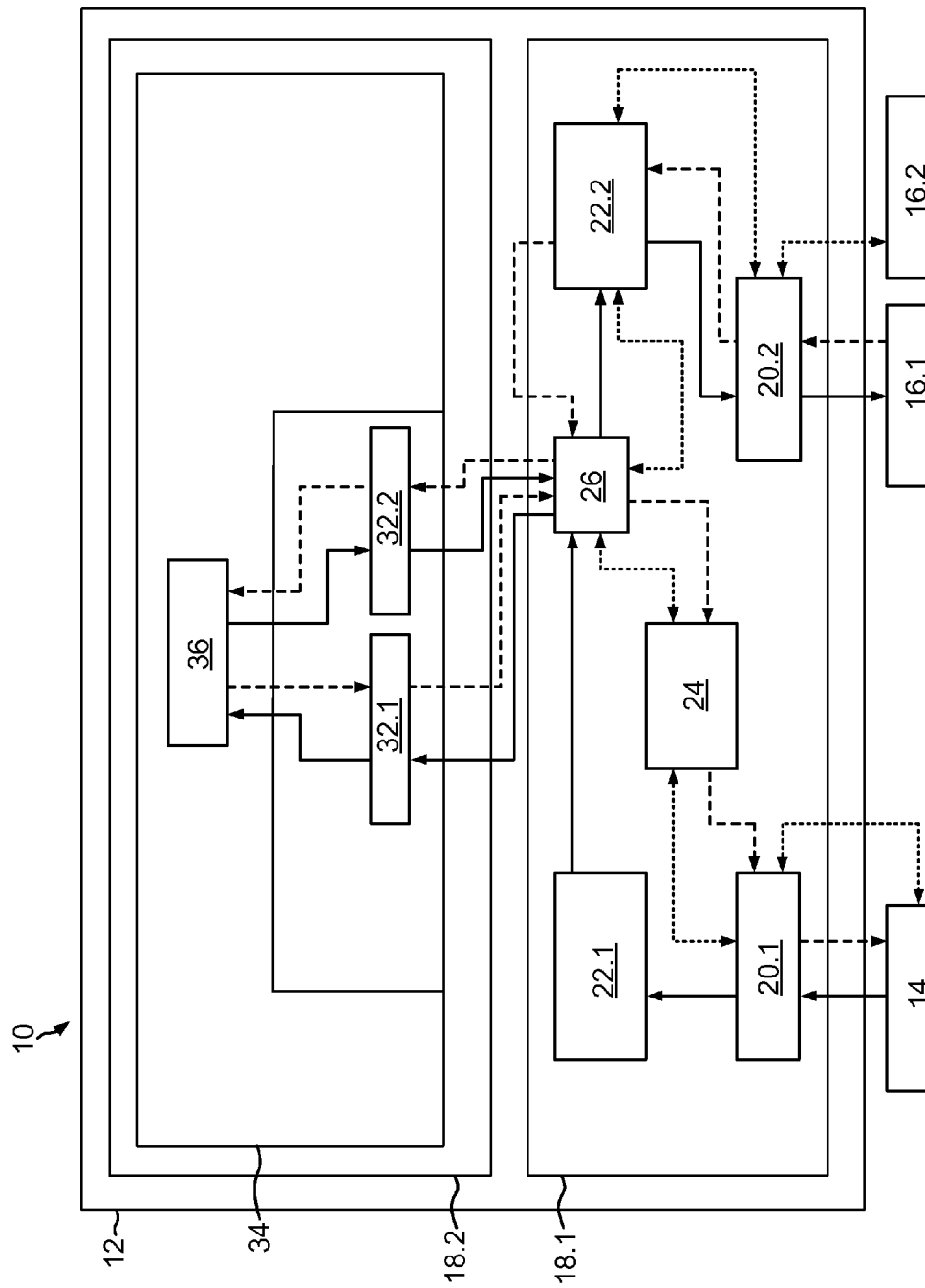
FIG. 1 shows schematically an arrangement where a single application is present in the user space of a single operating system.

Referring now to FIG. 1, a system for handling a digital electronic flow in accordance with the invention is designated generally by reference numeral the system 10 comprises an apparatus 12 which is connected between client 14 and servers 16.1 and 16.2. In this example the apparatus 12 is connected to a network or other telecommunication systems in such a way that network traffic or other communication is instructed (by virtue of addressing at a specific layer e.g. Layer 2) or forced (by virtue of the topology of physical connectivity) to traverse the apparatus 12, i.e. the apparatus is a gateway, a router, a switch, a "bump in the wire" bridge, or a similarly attached device.

The hardware of the apparatus 12 comprises a special purpose processor subsystem 18.1 and a general purpose processor subsystem 18.2. The processor subsystems 18.1 and 18.2 are interconnected using a communication mechanism (not shown) which is able to support interchange of messages between the subsystems or provide a memory area shared by both processor subsystems which enables them to communicate.

The special purpose processor system 18.1 comprises network interface hardware 20.1 and 20.2 as well as a set of processors and coprocessors which are dedicated to identifying, classifying and processing network traffic. Flow identification and classification subsystems 22.1 and 22.2, an action graph subsystem 24 and a virtual switch (VX) subsystem 26 are hosted on this set of processors and coprocessors.

The client 14 is connected to network interface 20.1. This network interface is connected to the flow ID and classification subsystem 22.1 which is connected to the virtual switch 26. Network interface 20.1 is also connected to action graph 24 which is again connected to the virtual switch 26.

The servers 16.1 and 16.2 are connected to network interface 20.2. This network interface is connected to the flow ID and classification subsystem 22.2 which is connected to the virtual switch 26.

The general purpose processor system 18.2 consists of one or more processor cores within one or more processor devices. These cores and devices are interconnected to form a multiprocessor system. The multiprocessor hosts a general purpose operating system with its kernel mode software environment 30 and its user mode software environment 32. Within the kernel mode software environment are located Virtual Network Interface Cards (VNICs) 32.1 and 32.2. Within the user mode software environment is hosted application 36. Application 36 is connected to VNICs 32.1 and 32.2, either directly or indirectly via the kernel 30. VNICs 32.1 and 32.2 are connected to the virtual switch 26.

In use, client 14 establishes a communication session with server 16.1 and (at nearly the same time or at different times) with server 16.2—for example it might establish TCP sessions (however any network protocol/communication session over any media could be supported).

Information sent by client 14 (in this example encapsulated in datagrams/packets) enters the apparatus via network interface 20.1.

The flow identification and classification component 22.1 determines that flows are being established and identifies the flows associated with each datagram it receives. In this way the datagrams in the flow are bundled together (associated with each other).

The flow identification and classification component 22.1 furthermore inspects and analyses packet headers, packet content, and flow content; detects and decodes protocols (including nested protocols); and extracts information from flows. The classification process is governed by policy specification information which is supplied by the system and/or by applications running on the system. The policy specification information may take the form of a set of rules or a set of matching expressions, both of which specify criteria and the policy which is to be applied if the criteria are fulfilled.

The flow identification and classification component 22.1 is composed of multiple submodules interconnected in an arbitrary graph structure. The submodules implement specific aspects of the classification process, e.g. one submodule may be able to detect and decode a specific protocol while another may be able to perform a specific matching operation. Submodules use coprocessors where appropriate to perform processing tasks, e.g. an encryption coprocessor may be used to decrypt information in order to obtain the content of a flow, or a regular expression parsing coprocessor may be used to assist in the matching process.

The result of flow classification is the policy that needs to be applied to the flow (or other non-flow transmitted information). In this example, the policy has specified that flows that match specified criteria from client 14 to server 16.1 should be routed to the application 36 via Virtual Network Interface Card (VNIC) 32.1.

To the application 36 and the operating system kernel 30, VNIC 32.1 and VNIC 32.2 appear to be standard network interfaces (i.e. device drivers). The application is configured to obtain network traffic from VNICs 32.1 and 32.2, either as raw network packets or via protocol stacks embedded in the kernel 30. The application is unaware that the network interface is a virtual and not a real network interface, and is similarly unaware that traffic has been processed prior to arriving at the network interface. The application 36 analyses the traffic in the flow and determines that the flow should proceed. After processing the traffic, e.g. modifying packet headers or flow content, the application 36 sends the traffic out via VNIC 32.2. As data has been passed through a VNIC which is compatible with a standard network interface, metadata determined by the flow identification and classification system, for example tags that are linked to policy to be applied to the flow as well as information representing the result of flow classification, have been lost. The traffic therefore needs to be forwarded to the second flow identification and classification subsystem 22.2 in order for the flow identifier and flow policy to be determined. In this example, the policy specifies that no further actions need to be applied to the traffic and that the traffic merely needs to be transmitted via network interface 20.2. The server 16.1 then receives the traffic.

Server 16.1 processes the information it has received and returns modified information or other information (e.g. information requested by the client). The information transmitted by the server is termed the return traffic or the return portion of the flow. In this example the return traffic is received via network interface 20.2 whereupon the flow identification and classification subsystem 22.2 again identifies the flow to which the received traffic belongs and determines the policy to be applied to the flow. In this case the policy indicates that the traffic is to be forwarded to VNIC 32.2, whereupon the application 36 performs any required processing and forwards (possibly modified) traffic to VNIC 32.1, from where traffic is received by virtual switch 26 and transmitted to action graph 24.

Note that in this example all traffic transmitted via VNIC 32.1 is destined for client 14 and is processed in the same way by action graph 24. The policy applied to this traffic is neither dependent on the flow to which the traffic belongs nor dependent on traffic or flow content. As this traffic therefore does not need to be processed by a flow identification and classification subsystem, it is routed directly to the action graph 24. This example illustrates that the system is able to determine that functions are not required in some circumstances and accordingly optimize the routing of flows within the system.

The action graph 24 consists of action modules connected in an arbitrary graph. In this example, the action graph could consist of a traffic monitoring module which keeps statistics with respect to bytes and packets passing through the system, a firewalling module which filters out a subset of the traffic, and a traffic management module which limits the bandwidth of traffic.

Note that the different directions of traffic within a flow, i.e. the forward and return traffic, need not follow the same path through the system and may be treated differently by subsystems and modules along the path. In this example, the return traffic passes through an action graph, whereas the forward traffic did not. Note also that the flow handling policy may be adjusted over the lifetime of the flow, either by the system continuing to classify traffic and correspondingly refining the policy, or by the policy being modified by administrators or applications over the lifetime of the flow. This may result in the path being modified or parameters used by subsystems in the path being modified.

A second flow is shown in FIG. 1 between client 14 and server 16.2. The flow is initiated by client 14 and analyzed and classified by flow identification and classification block 22.1. In this instance the system determines that there is no need for application 16 to receive the traffic contained in the flow, perhaps because the application is performing a security function and the client and server are trusted. The system routes the flow via action graph 24 to network interface 20.2. The system "cuts through" this flow, meaning that all processing of this flow is done within system 18.1 and that the flow is never routed through processor 18.2, therefore neither processed by the operating system 30 nor by the application 36.

Figure 2:
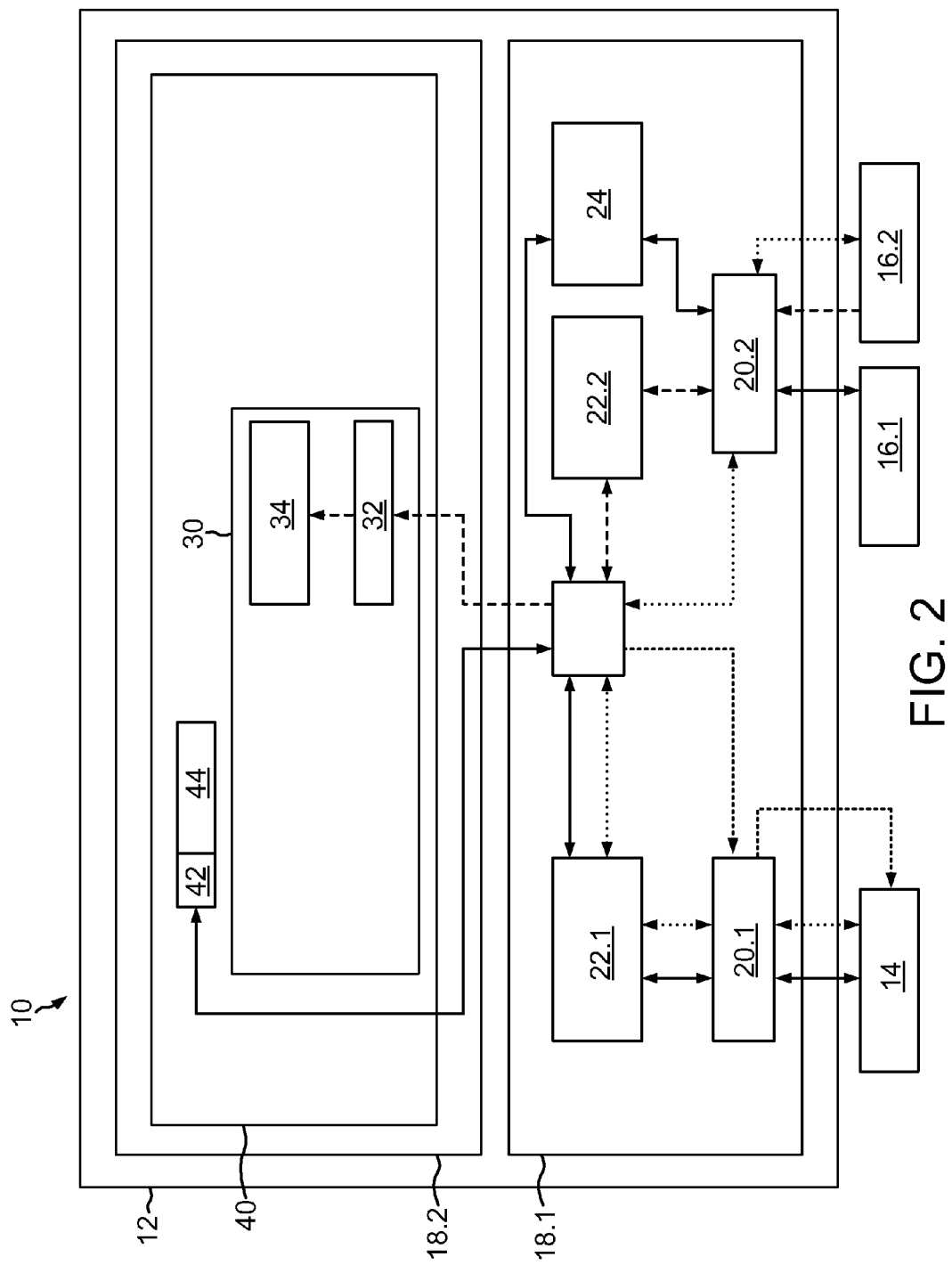
FIG. 2 shows schematically an arrangement where multiple applications are present, one in user space and another in kernel space, both within a single operating system.

FIG. 2 shows another example of the system in operation. The system 12 is composed of processing systems 18.1 and 18.2. Processing system 18.2 is running a single instance of an operating system such as Linux with the operating system kernel 30 and operating system user space 40. The operating system is supporting two third party applications, for example an Intrusion Detection application 44 running in user space and a monitoring application 34 running in the operating system kernel. Client 14 establishes a session with server 16.1. The flow connects to the system via network interface 20.1 and is passed to a flow identification and classification module 22.1. An initial classification results in a policy that determines that the flow should be sent out on network interface 20.2 after being processed by action graph 24. The initial policy also indicates that a copy of the flow be generated and sent to VNIC 32 which allows application 34 running in the operating system kernel to receive the flow. Note that application 34 is a "read only" application in that it does not want to modify the flow on its way to server 16.1. As more of the flow information is analyzed by the flow ID and classification module 22.1 a final classification becomes possible. At this point it is determined that application 44 needs to receive the flow and may want to modify the flow. In the example shown the flow is passed to application 44 via a library implementing an application programming interface (API) 42 rather than using a VNIC. The developer of application 44 has explicitly made use of the interface provided by the library implementing the API 42. In the example shown the traffic contained in the flow is sent to application 44 and the system waits for the traffic to be returned by application 44 before forwarding the traffic on to server 16.1 with a copy continuing to be forwarded on to application 34. Clearly other options are possible depending on the policy configured and whether or not applications and subsystems receiving the data modify the data, such as making several copies of data and forwarding the data to several applications and subsystems in parallel.

After a period of time application 44 may determine that the flow no longer poses a threat and that it does not need to see the remaining traffic in the flow. At this point application 44 can indicate to the system that it no longer wishes to continue receiving this flow. The system will stop sending the flow to application 44 while still forwarding the flow to server 16.1 with a copy being sent to application 34. The ability to "hand back" a flow frees up resources in application 44 and increases performance.

FIG. 2 also shows an example of the system processing associated flows. A second flow in this example occurs between client 14 and server 16.2. This flow is determined by the flow identification and classification system 22.1 to be a flow which provides advanced notification of a future flow that will occur. An example may be a flow carrying a signalling protocol such as SIP which refers to an associated media flow which carries digitized voice. The system classifies the flow and routes it to server 16.2 while collecting information from the flow relating to any future flows that may be established. While the second flow is still active or after it has finished, a third flow commences from server 16.2 back to client 14. This third flow is processed by the flow identification and classification function 22.2 and is recognized as being an associated flow (based on the information collected from the second flow) for which policy has already been determined. An example of such a third flow might be the media stream associated with the signalling traffic contained in the second flow.

Figure 3:
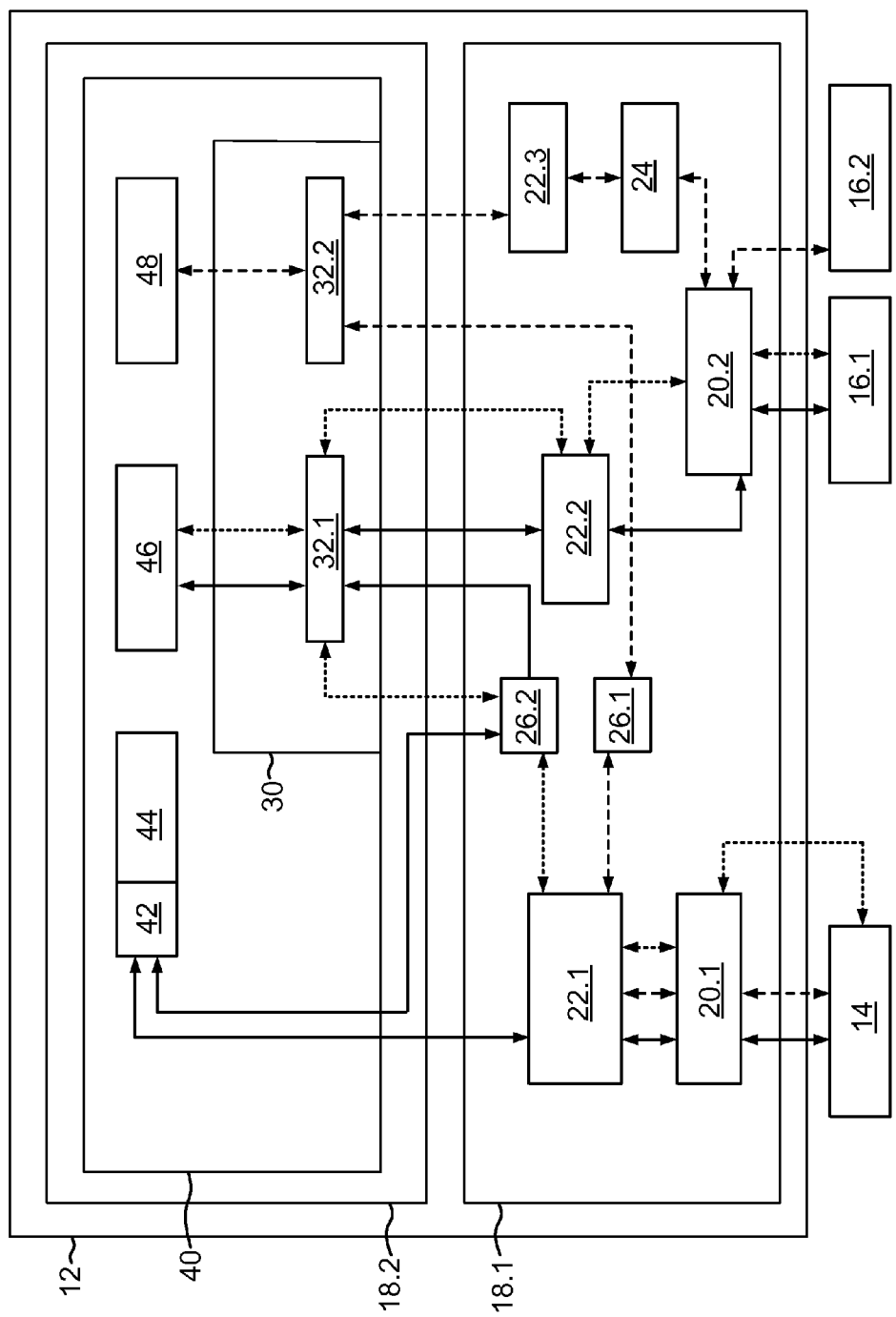
FIG. 3 shows schematically an arrangement three applications, one of which interfaces to the system using a library and application programming interface (API) whereas two of which interface to the system using virtual network interface cards (VNICs), all of which are hosted within a single operating system.

FIG. 3 shows an example of the system handling flows, which need to be processed by more than one application. It also illustrates the use of VNICs to allow consolidation of multiple applications on the same platform.

In this example, a flow occurs between client 14 and server 16.1. Flow identification and classification system 22.1 determines that the traffic within the flow needs to be processed by application 44. The flow policy specifies that application 44 has been developed to make use of the API provided by the system, and that traffic destined for application 44 needs to be routed to the application via component 42, which constitutes a library implementing the system API. The flow policy also specifies that after processing by application 42 this flow should be routed to application 46 for further processing, and that application 46 is attached to VNIC 32.1. As application 44 is using the system APIs, the flow policy for this flow can be retained as metadata which is kept with the flow contents, therefore there is no need to perform flow identification and classification on the traffic which has been processed by application 44. Once the traffic has been processed by application 46, however, the data output by application 46 needs to be passed through flow identification and classification subsystem 22.2. This is required because the traffic passes through a VNIC, which does not make provision for retaining metadata like flow policy. Once the flow identification and classification subsystem 22.2 has identified the flow and determined the flow policy, the system transmits the flow's traffic to server 16.1 via network interface 20.2 in accordance with the flow policy.

In this example, a second flow exists between client 14 and server 16.1. The flow policy for this second flow specifies that the flow needs to traverse application 46, which is attached to VNIC 32.1. Note that application 46 is processing the second flow which is routed directly to it as well as the first flow which is routed to it via application 44. Application 46 is unaware of any processing of the flow that occurs prior to it receiving the flow, for example in the case of the first flow application 46 does not know that it has already been processed by application 44—it merely receives potentially altered or filtered flow content.

The third flow in this example occurs between client 14 and server 16.2. It is classified by flow identification and classification subsystem 22.1 and is determined to require routing to application 48 using a different internal virtual network to that being used for the first and the second flow. The third flow is routed via virtual switch 26.1, whereas the other flows are routed via virtual switch 26.2. The third flow is routed to application 48 using VNIC 32.2. This use of a separate VNIC and virtual switch within the system provides a greater degree of isolation between the third flow and the other flows than exists between the first and the second flow. It also offers opportunities for the system to optimize performance.

Figure 4:
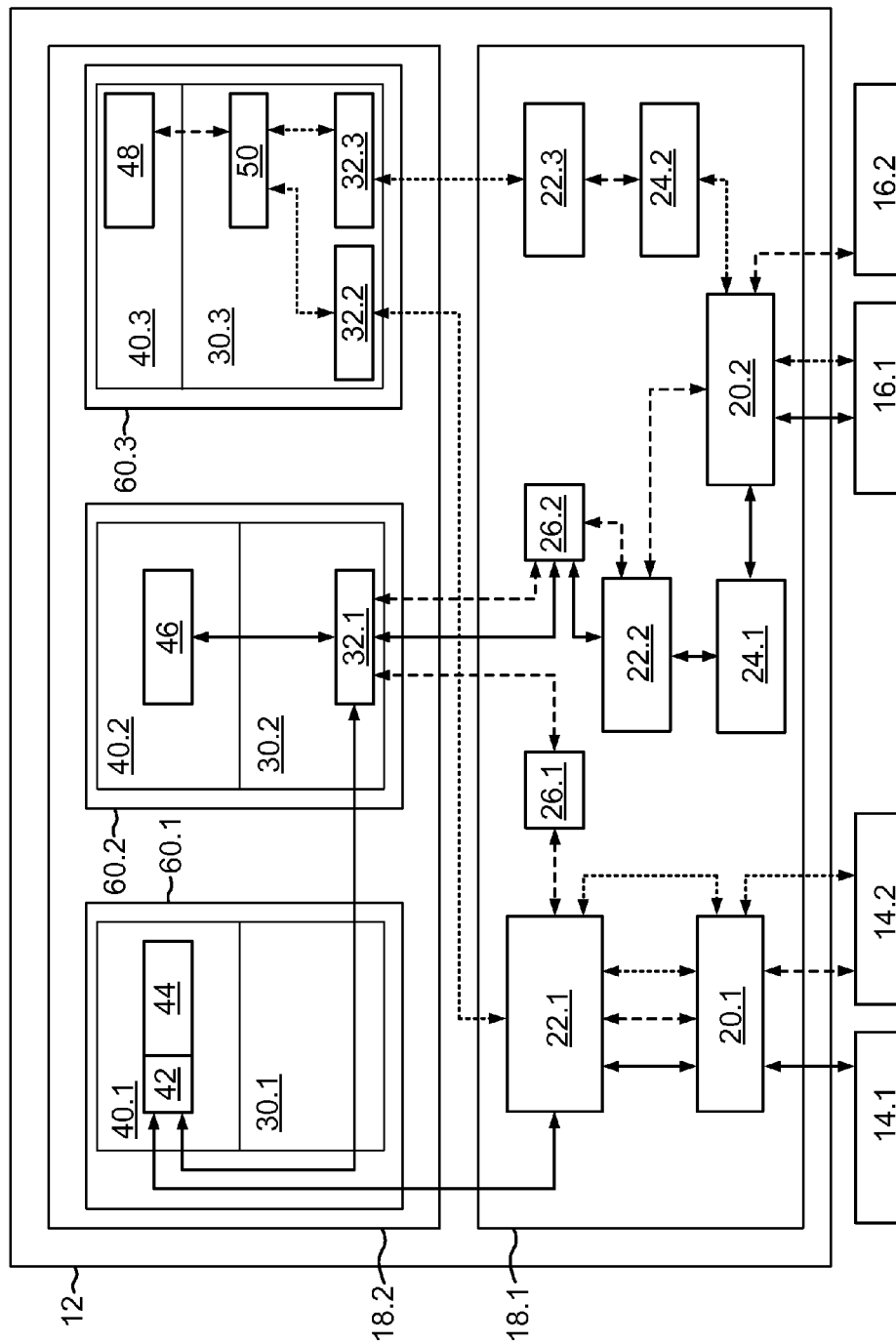
FIG. 4 shows schematically an arrangement where applications are running within three separate operating system instances, each of which is hosted in a separate virtual machine (VM);).

FIG. 4 shows an example of the system 12 providing virtual machines 60.1, 60.2 and 60.3 respectively to support guest operating system kernels 30.1, 30.2 and 30.3, with operating system user spaces 40.1, 40.2 and 40.3, and applications running in kernel or user mode within these operating systems. The system can support a variable number of virtual machines with each virtual machine having the ability to host a different type or version of guest operating system, and/or differently configured instances of the same type or version of guest operating system. Each of the guest operating systems can host the same application or host different applications.

In this example, a flow occurs between client 14 and server 16.1. The flow is received by network interface 20.1, whereupon it is classified by flow identification and classification subsystem 22.1 and determined to require processing by application 44 running in virtual machine (VM) 60.1. Application 44 is able to receive content via system API implementation library 42. Note that the system can deliver the flow content directly to an application running in user space 40.1 within the guest OS running in VM 60.1 without needing forwarding or handling by the guest OS kernel 30.1.

In this example, the configured flow handling policy specifies that all traffic processed by application 44 also needs to be processed by application 46 in virtual machine 60.2, and that the traffic needs to be passed to application 46 via VNIC 32.1. Once processed by application 46, the flow exits virtual machine 60.2 via VNIC 32.1 and is forwarded by virtual switch 26.2 to flow identification and classification subsystem 22.2, which determines the flow policy to be subsequently applied. The flow policy specifies that the flow should be sent to action graph 24.1 for processing before being sent to server 16.1 or server 16.2, both via network interface 20.2. Action graph 24.1 in this example performs a load balancing function to select the server which should receive the flow.

A second flow exists between client 14.2 and server 16.1. The traffic in the second flow enters the system via network interface 20.1, whereupon it is handled by flow identification and classification subsystem 22.1. The configured flow policy specifies that this flow requires processing by application 46, which runs in VM 60.2 and which is attached to VNIC 32.1. On exiting VNIC 32.1, virtual switch 26.2 forwards the traffic to flow identification and classification subsystem 22.2. This subsystem reclassifies the traffic and determines that it should be sent to server 16.2 via network interface 20.2. Note that the first flow and the second flow both exit VNIC 32.1 but are processed differently depending on the result returned by flow identification and classification subsystem 32.1.

A third flow exists between client 14.2 and server 16.1. The traffic in this flow is received by network interface 20.1 and handled by flow identification and classification subsystem 22.1. The configured flow policy specifies that this flow needs to be processed by application 50 which is attached to VNIC 32.2. Application 50 is running in the guest operating system kernel 30.3 within virtual machine 60.3. The traffic belonging to this flow is therefore routed to VNIC 32.2. Application 50 passes the flow content to application 48, which is running in user space inside virtual machine 60.3. Traffic returned by application 48 is received by application 50, which sends the traffic onwards via VNIC 32.3, whereupon it is processed by flow identification and classification subsystem 22.3. This determines that the flow policy mandates routing traffic through action graph 24.2 before the traffic is delivered to server 16.1 via network interface 16.2. Note that arbitrarily complex paths through the system are possible, which may involve multiple VNICs per virtual machine as well as kernel mode and user mode applications. Note also that traffic belonging to a flow often enters a virtual machine via one VNIC and exits the virtual machine via another VNIC. Furthermore, note that the flow identification and classification subsystems cooperate where appropriate to ensure that the flow policy is correctly and consistently applied to the flow as it makes its way through the system. Flow identification and classification subsystem 22.1 may for example communicate the policy to be applied to the third flow to flow identification and classification subsystem 22.3 via a control channel (not shown on the diagram).

Figure 5:
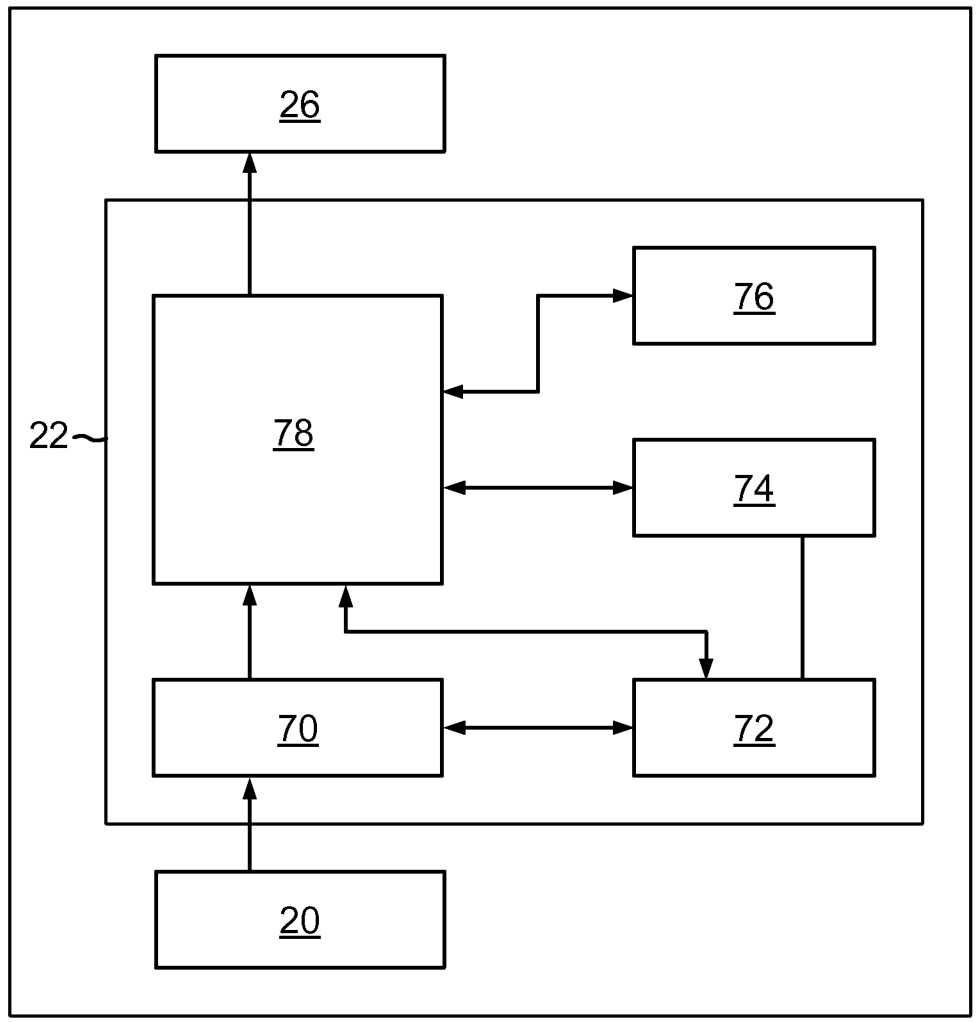
FIG. 5 shows schematically the subcomponents of the flow identification and classification subsystem, which subsystem is part of the aforementioned figures.

Referring now to FIG. 5 which depicts the subcomponents of a flow identification and classification subsystem 22 and an example usage scenario of the subsystem. In this example, traffic is fed to the subsystem 22 from a network interface 20, and exits the subsystem to virtual switch 26.

Within the subsystem, traffic is first received by the flow identification component 70. This component serves to identify the flow to which the traffic belongs by performing one or more lookups in the flow state table 72. This table correlates flow identifying information present in traffic, like information contained in packet headers as well as information present in the content of packets, with flow identifiers. The component is for example able to determine that traffic with the same IP addresses and TCP ports belongs to the same flow. In some cases, packet content also needs to be consulted, for example an application layer (i.e. layer seven) information may serve to distinguish flows which share the same basic IP header information. The component has enough intelligence and keeps enough state of the application layer protocol to enable it to extract the flow identifying information.

Where the first traffic element is received for a flow, the flow is termed a new flow, and a new flow identifier is assigned by component 70. For subsequently received traffic elements, component 70 will retrieve the previously assigned flow identifier.

Furthermore the component 70 is able to identify and distinguish between multiple flows that are nested within a single outer flows, as may occur in the case of tunneled traffic. Where flows are nested, the nested flow is identified by the combination of the identifier of the containing flow and the identifier of the contained flow.

Furthermore, the component 70 is able to identify the flows that are associated with a specific flow. In this example, a flow is linked to associated flows via the combination of the flow state table 72 and the separate associated flow table 74, however, tables 72 and 74 may be combined.

In the case of flows containing other flows, the contained flows will be associated using a sibling relationship with all the flows in the same containing flows. The containing and contained flows will be associated using a parent-child relationship.

Other types of associated flows are also understood by the system, for example all the flows which have been initiated by a specific user may be associated, or signalling traffic may be associated with media streams controlled by this signalling traffic, or traffic between specific hosts or subnets may be associated. Multiple levels of association and multiple association relationships between flows are simultaneously supported.

After component 70 has assigned a flow identifier or retrieved the flow identifier, it forwards the received traffic and the flow identifier to the flow classification and policy determination component 78. This component first retrieves the tag which indicates the policy to be applied to the flow from the flow state table 72. Component 70 alternatively forwards the tag along with the flow identifier to component 78.

Should the tag indicate that the policy has been completely determined for the flow, the flow policy determining component 78 then forwards the flow together with information specifying the policy to be applied to the flow onward to the appropriate subsystem as defined by the policy. In this example, the flow is forwarded to virtual switch 26.

Initially however the tag may indicate that policy has not been completely determined yet. The flow policy determining component 78 therefore proceeds to classify the traffic in order to determine the policy. This classification process involves extracting, decoding, and interpreting flow content in a stateless or stateful manner, continually matching the flow content or information extracted from/determined from the flow content to rules and expressions that are specified in the policy database 76. Should rules match or expressions return policy updates, the policy associated with the flow is updated, with the updates being reflected in changes to the tag associated with the flow or changes to the policy associated with the tag. In this way the policy is successively refined over the lifetime of a flow.

The policy database 76 may also refer to information which is present in or derived from flows associated with the flow which is being classified. The flow policy determining component 78 is therefore able to consult the associated flow table 74 and entries in the flow state table 72 pertaining to the associated flow in order to obtain the information to which the rules refer. The policy database may for example specify that media streams for which the associated signalling flow refer to username "JSmith" need to be forwarded using a quality of service class three, whereas other media streams receive quality of service class four.

The information present in the policy database 76, the flow state table 72 and the associated flow table 74 can also be dynamically altered by other components in the system. Different instances of the flow identification and classification subsystem may communicate amongst each other to ensure that flow policy is appropriately and consistently applied throughout the system. It is also possible for applications to invoke APIs which pre-populate the flow state table 72 or the associated flow table 74 with information enabling flow policy to be pre-configured for flows that are expected to occur in future. Applications can dynamically change the policy to be applied to flows by invoking APIs. These changes will result in the flow state table 72 and/or the associated flow table 74 being updated. The content of the policy database 76 can also be modified at any time by applications or the system administrator.

It will be appreciated that the flow policy determining component 78 needs to be able to detect and decode a variety of protocols in order to be able to determine whether policies need to be applied which refer to the presence of these protocols, or policies which refer to elements contained within traffic transmitted using these protocols. The component 78 therefore contains subcomponents, each of which is responsible for detecting or decoding a specific protocol or set of protocols. As protocols are often layered on other protocols, the subcomponents need to interact. Subcomponents are also employed to assist with specific matching operations. These subcomponents enlist coprocessors where such coprocessors are available to speed up operations, for example the subcomponent dealing with a compressed protocol may use a decompression coprocessor, whereas the subcomponent performing pattern matching may use regular expression matching hardware.

It is contemplated that the invention could be used in the following list of illustrative examples of potential applications. This list is not intended to be exhaustive.

Consolidation of application software which was running on multiple real machines (computers) into a single virtual machine.

Consolidation of appliances to enable multiple appliances to be replaced with a smaller number of devices equipped with virtualisation technology. In this context, an appliance is a computing device, possibly with specialized peripherals/interfaces like network interfaces, possibly with other specialized hardware like coprocessors, combined with software supplied by the device vendor or a vendor associated with the device vendor, where the appliance has been designed to perform one of a small number of functions. Examples of appliances include firewalls, intrusion detection/prevention devices, anti-virus and anti-spam devices, etc.

Enabling existing virtual machine systems to process and direct (i.e. control the processing/forwarding of) network traffic.

Hosting a new class of network infrastructure applications which combine traditional server like processing with traffic and flow directing/manipulating etc.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. An apparatus for handling first and second digital electronic flows, wherein the first flow comprises a plurality of first datagrams, wherein the first datagrams include datagram header information and datagram payload information, wherein at least one of the first datagrams contains application layer payload information, wherein the second flow comprises a plurality of second datagrams, wherein the second datagrams include datagram header information and datagram payload information, and wherein at least one of the second datagrams contains application layer payload information, the apparatus comprising:
a network interface through which at least some of the first datagrams and at least some of the second datagrams pass; and
a plurality of processing components upon which a flow identification and classification subsystem is hosted, wherein the plurality of processing components inspects at least some of the first datagrams and based at least in part on datagram header information and application layer payload information of the first datagrams causes a first flow policy to be applied to the first flow such that at least some of the first datagrams of the first flow take a first path through the plurality of processing components of the apparatus, and wherein the flow identification and classification subsystem inspects at least some of the second datagrams and based on at least in part on datagram header information and application layer payload information of the second datagrams causes a second flow policy to be applied to the second flow such that at least some of the second datagrams of the second flow take a second path through the plurality of processing components of the apparatus, wherein the network interface and the plurality of processing components together comprise a special purpose processor subsystem, the apparatus further comprising:
a general purpose processor subsystem that hosts a general purpose operating system, wherein an application layer program executes on the general purpose processor subsystem, wherein a flow policy causes a copy of a flow to be communicated from the special purpose processor subsystem to the application layer program.

2. The apparatus of claim 1, wherein the flow identification and classification subsystem stores an arbitrary pattern, wherein the flow identification and classification subsystem extracts data from the first flow and performs a matching operation of the extracted data against the arbitrary pattern, and wherein which one of a plurality of flow policies is applied to the first flow depends at least in part on a result of the matching operation.

3. The apparatus of claim 1, wherein the flow identification and classification subsystem classifies transmitted information and thereby determines that the first flow policy will be used to process the first flow, and wherein the transmitted information is transmitted information associated with a specific set of communicating entities.

4. The apparatus of claim 1, wherein the flow identification and classification subsystem classifies transmitted information and thereby determines that the first flow policy will be used to process the first flow, and wherein the transmitted information is transmitted information which contains a specified pattern in a specified part of the flow.

5. The apparatus of claim 1, wherein the flow identification and classification subsystem causes the first flow policy to be applied to the first flow such that first datagrams of the first flow take the first path through the plurality of processing components of the apparatus, and wherein the flow identification and classification subsystem later causes a third flow policy to be applied to the first flow such that second datagrams of the first flow take a third path through the plurality of processing components of the apparatus.

6. The apparatus of claim 1, wherein a third flow is communicated from the special purpose processor subsystem to the general purpose processor subsystem, and wherein the third flow is communicated back from the general purpose processor subsystem to the special purpose processor subsystem.

7. The apparatus of claim 1, wherein the flow identification and classification subsystem classifies transmitted information and thereby determines that a third flow policy will be used to process a forward portion of a third flow, and thereby determines that a fourth flow policy will be used to process a return portion of the third flow.

8. The apparatus of claim 1, wherein the flow identification and classification subsystem causes the first flow policy to be applied to the first flow based at least in part on a protocol used by the first datagrams.

9. The apparatus of claim 1, wherein the first flow is communicated between two entities, and wherein the flow identification and classification subsystem causes the first flow policy to be applied to the first flow based at least in part on the identities of two entities.

10. The apparatus of claim 1, wherein the first and second datagrams are IP packets, and wherein the flow identification and classification subsystem causes the first flow policy to be applied to the first flow based at least in part on an IP source address of at least one of the first datagrams, and based at least in part on an IP destination address of at least one of the first datagrams.

11. The apparatus of claim 1, wherein the apparatus decrypts a portion of the first flow thereby obtaining decrypted information, and wherein the flow identification and classification subsystem uses the decrypted information to determine that the first flow policy will be applied to the first flow.

12. The apparatus of claim 1, wherein the apparatus is an apparatus taken from the group consisting of: a gateway, a firewall, a proxy, a router, a switch, an anti-spam appliance, an anti-virus appliance, an intrusion detection device, a relay, a bump-in-the-wire bridge, and a self-learning multi-port bridge.

13. An apparatus for handling first and second digital electronic flows, wherein the first flow comprises a plurality of first packets, wherein the first packets include IP address information, TCP port information, and application payload information, wherein the second flow comprises a plurality of second packets, wherein the second packets include IP address information, TCP port information, and application payload information, the apparatus comprising:
   a network interface through which at least some of the first packets and at least some of the second packet pass; and
   a plurality of processing components that inspects at least some of the first packets and based on at least the IP address information, the TCP port information, and the application layer payload information of the first packets causes a first flow policy to be applied to the first flow such that first packets take a first path through the plurality of processing components of the apparatus, wherein the plurality of processing components inspects at least some of the second packets and based on at least the IP address information, the TCP port information, and the application layer payload information of the second packets causes a second flow policy to be applied to the second flow such that second packets take a second path through the plurality of processing components of the apparatus, wherein the plurality of processing components classifies transmitted information and thereby determines that a third flow policy will be used to process a portion of a third flow, and thereby determines that a fourth flow policy will be used to process another portion of the third flow.

14. A method comprising:
   (a) receiving first and second digital electronic flows onto an apparatus, wherein the first flow comprises a plurality of first datagrams, wherein the first datagrams include datagram header information and datagram payload information, wherein at least one of the first datagrams contains application layer payload information, wherein the second flow comprises a plurality of second datagrams, wherein the second datagrams include datagram header information and datagram payload information, and wherein at least one of the second datagrams contains application layer payload information;
   (b) inspecting at least some of the first datagrams and based on at least in part on datagram header information and application layer payload information of the first datagrams causing a first flow policy to be applied to the first flow such that at least some of the first datagrams of the first flow take a first path through a plurality of processing components of the apparatus;
   (c) inspecting at least some of the second datagrams and based on at least in part on datagram header information and application layer payload information of the second datagrams causing a second flow policy to be applied to the second flow such that at least some of the second datagrams of the second flow take a second path through the plurality of processing components of the apparatus; and
   (d) changing the flow policy applied to the first flow such that during a first time period the first flow policy is applied to the first flow and such that during a second time period a third flow policy is applied to the first flow, wherein the apparatus comprises a network interface, the plurality of processing components and a processor, wherein the first and second flows are received in (a) onto the network interface, wherein the inspecting in (b) is carried out by the processor, and wherein the inspecting in (c) is carried out by the processor.

15. The method of claim 14, further comprising:
   storing an arbitrary pattern on the apparatus; and
   extracting application layer data from the first flow and performing a matching operation of the extracted application layer data against the arbitrary pattern, and wherein the causing the first flow policy to be applied in (b) depends at least in part on a result of the matching operation.

16. The method of claim 14, wherein the first flow is communicated between a set of entities, and wherein the causing the first flow policy to be applied in (b) depends at least in part on the identities of the entities.

17. The method of claim 14, further comprising:
   receiving a third flow onto the apparatus;
   applying a third flow policy to process a forward portion of the third flow; and
   applying a fourth flow policy to process a return portion of the third flow.

18. The method of claim 14, wherein the causing a first flow policy to be applied to the first flow in (b) is based at least in part on a protocol used by the first datagrams.

19. A special purpose processor subsystem that is adapted to be coupled to a general purpose processor subsystem such that the special purpose processor subsystem and the general purpose processor subsystem together comprise an apparatus, wherein the apparatus is for handling first and second digital electronic flows, wherein the first flow comprises a plurality of first datagrams, wherein the first datagrams include datagram header information and datagram payload information, wherein at least one of the first datagrams contains application layer payload information, wherein the second flow comprises a plurality of second datagrams, wherein the second datagrams include datagram header information and datagram payload information, and wherein at least one of the second datagrams contains application layer payload information, wherein the special purpose processor subsystem comprises:
   a network interface through which at least some of the first datagrams and at least some of the second datagrams pass;
   a plurality of processing components upon which a flow identification and classification subsystem is hosted, wherein the flow identification and classification subsystem inspects at least some of the first datagrams and based at least in part on datagram header information and application layer payload information of the first datagrams causes a first flow policy to be applied to the first flow such that at least some of first datagrams of the first flow take a first path through the plurality of processing components, wherein the flow identification and classification subsystem inspects at least some of the second datagrams and based on at least in part on datagram header information and application layer payload information of the second datagrams causes a second flow policy to be applied to the second flow such that at least some of second datagrams of the second flow take a second path through the plurality of processing components, and wherein a flow policy causes a copy of a flow to be communicated from the special purpose processor subsystem to an application layer program executing on the general purpose processor subsystem.

* * * * *